United States Patent Office 3,535,167
Patented Oct. 20, 1970

3,535,167
CHROMIC ACID-DIMER ACID COATING COMPOSITION FOR METALS
Jon A. de Ridder, Ashtabula, and John J. Freer, Cleveland Heights, Ohio, assignors to Diamond Shamrock Corporation, Cleveland, Ohio, a corporation of Delaware
No Drawing. Filed Apr. 16, 1968, Ser. No. 721,617
Int. Cl. C23f 7/26; C09d 5/08
U.S. Cl. 148—6.2   8 Claims

ABSTRACT OF THE DISCLOSURE

Corrosion-inhibiting, hexavalent-chromium-containing coating compositions for metal surfaces are prepared with chromic acid in combination with at least one dicarboxylic polymer acid having ethylenic unsaturation and being formed from polyenoic monobasic acids. The polymer acids are employed in the coating composition along with an additional organic component such as an amino acid, amide, diamide, lactam, dilactam, imide and the like. Compositions are cured on the metal surface at elevated temperature to enhance adhesion of the resulting residue to such surface. Surfaces containing such residue exhibit outstanding corrosion resistance and may augment adhesion for subsequently applied paints to the metal substrate.

BACKGROUND OF THE INVENTION

In the copending U.S. application Ser. No. 484,747 of P. R. Cutter and D. N. Hamilton, now Pat. No. 3,382,081 issued May 7, 1968 it has been disclosed that desirable corrosion-inhibiting, hexavalent-chromium-containing coatings can be formed with chromic acid solutions wherein substantially all of the chromium is contained as hexavalent chromium, when the solution also contains an organic saturated dicarboxylic acid, such as succinic acid, which acid may also be in combination with, for example, an amino-substituted compound such as acrylamide, or the amino acid aspartic acid. Upon curing applied coatings, e.g., as applied on a metal substrate, the resulting treated metal surface, in addition to corrosion resistance, may also offer enhanced adhesion for subsequently applied paint.

SUMMARY OF THE INVENTION

It has now been found that this particular combination of desirable features, e.g., corrosion-resistance and adhesion promotion for subsequently applied paints can be obtained by supplying a chromic acid dispersion with organic dicarboxylic acids which, rather than being saturated acids, are acids having ethylenic unsaturation and furthermore are high molecular weight dibasic polymer acids formed from polyenoic monobasic acids. Additionally, the organic component of this coating composition is supplied with a subsequent compound such as amino acids or amides, diamides, imides, lactams, dilactams or other heterocyclic ring compounds containing carbon and nitrogen ring atoms. These newly found corrosion-resistant, hexavalent-chromium-containing coating compositions for metal substrates, after application and curing to the surfaces of such substrates, provide outstanding corrosion resistance for the metal substrate and particularly when exposed to the deleterious effects of condensing humidity, even when compared with such resistance provided by similarly prepared compositions mentioned hereinabove.

Broadly, the present invention is directed to a corrosion-inhibiting, hexavalent-chromium-containing coating composition for metal surfaces which comprises a volatile liquid having dispersed therein: (A) chromic acid in a concentration of between about 1 and 400 grams per liter; and (B) an organic component. The (B) organic component is composed of between about 60–90 weight percent of dicarboxylic polymer acid having ethylenic unsaturation and being formed from polyenoic monobasic acids having from about 12 to about 44 carbon atoms. The balance of the (B) organic component is between about 10–40 weight percent of at least one compound which is a group (a), or group (b) or group (c) compound or their mixtures. The group (a) compounds are amino acids free from sulfur, hydroxyl, and/or halogen substituents.

The group (b) compounds are of the structure $$R_1\text{---}CONHR_2$$

wherein $R_1$ and $R_2$ can be the same or different and $R_1$ is carbamyl, R', carbamyl substituted R', or carboxyl substituted R', and $R_2$ is hydrogen or R'. The group (c) compounds are heterocyclic-ring-containing compounds having at least one nitrogen atom and at least one carbon atom, with the remaining ring atoms being carbon and/or nitrogen, and (1) with each substituted ring nitrogen atom bearing a member represented by $R_2$ described hereinabove, and (2) wherein heterocyclic ring carbon atoms bear members selected from the group consisting of alkoxy, oxo, amino, $R_2$ as described hereinabove, and an aromatic ring, wherein two adjacent aromatic ring carbon atoms form a portion of the heterocyclic ring.

The R' used hereinbefore represents a member selected from the group consisting of alkyl, cycloalkyl, alkenyl, aryl, alkaryl, and aralkyl. Furthermore, the total weight of substituents from the (B) component is from about 5 to 200 grams per liter of coating composition, with the mole ratio of $CrO_3$ to the total of such (B) component substituents being within the range of about 9:1 to about 0.7:1.

Additionally this invention relates to a method for protecting metal substrate surfaces with an adherent, corrosion-resistant, hexavalent-chromium-containing coating composition, and further relates to articles thus prepared.

DESCRIPTION OF THE PREFERRED EMBODIMENTS

The hexavalent-chromium-containing coating compositions of this invention are often referred to herein, for convenience, simply as "coating compositions," or as "chromic acid compositions," or, because of the adherency of resulting residues to a metal substrate after curing as a "bonding" coating composition. The metal substrate surfaces which can be protected by such coating compositions include any such substrates which are, or may be, protected by a hexavalent-chromium-containing coating composition. For example, such metal substrate surfaces include aluminum and alloys thereof, zinc and zinciferous substrates, copper and cupriferous substrates, e.g., brass and bronze, as well as cadmium, titanium, nickel and its alloys, tin, lead, chromium, magnesium and alloys thereof, and for weldability, preferably a ferrous substrate, e.g., iron, stainless steel or steel such as cold rolled steel.

The chromic acid is present in the composition to the extent of about 1 to 400 grams per liter and generally about 30–45 grams per liter. It is to be understood that a minor amount of the chromic acid may be supplied by ammonium dichromate for the purposes of this invention. Moreover, lesser amounts of other water soluble salts of chromic acid, e.g., sodium dichromate, can be present in the composition for supplying a portion only of hexavalent chromium; but, after curing of the applied composition, a water rinse should be employed to enhance the corrosion resistance of the final coated surface.

For substituents which are only sparingly soluble in water, a nonaqueous liquid, in which both chromic acid and the organic component of the solution are soluble, which liquid must also be one that is not readily oxidized by chromic acid, may be used. Tertiary butyl alcohol is the preferred organic liquid, readily dissolving the chromic acid and higher molecular weight organic component compounds, as well as being relatively stable in aqueous chromic acid solutions at ordinary temperatures encountered during application and/or storage of the coating composition. Other alcohols are less desirable because of the limited solubility of chromic acid therein or because they are readily oxidized by the chromic acid. Advantageously, the liquid employed is a "volatile liquid," i.e., has a boiling point of about 100° C. or less at a pressure of 760 mm. Hg, to permit rapid drying of the applied coating composition.

When tertiary butyl alcohol is employed, essentially all of the compositions of this invention are solutions, although for economy, water is the preferred liquid used. However, since the dimer acids are not readily soluble in water, water-based coating compositions are prepared as dispersions; hence, the term "dispersion" is employed herein for convenience to refer to both composition solutions as well as such dispersions.

The organic component is between about 60–90 weight percent of non-aromatic, ethylenically unsaturated, dicarboxylic polymer acids. Less than about 60 weight percent of these compounds in the organic component can lead, after curing, to the presence on a metal substrate of a coating residue having undesirable adhesion to the substrate, i.e., such residue as is obtained after application of the coating to the substrate surface and heating of same. Moreover, these compounds are present in the organic component in an amount of less than about 90 weight percent, based on the total weight of this component, to augment coating durability and to provide coated substrates exhibiting suppressed liberation of unwanted chromium, which is more particularly defined hereinbelow.

The ethylenically unsaturated dicarboxylic polymer acids are simple polymers, i.e., preponderantly two unit polymers, of polyenoic monobasic acids having about 12–44 carbon atoms. Preparation of these polymer acids is referred to, for example, or shown in U.S. Pats. 2,646,399 and 2,718,503. For convenience, these acids are often referred to herein as "dimer" acids. However, such dimer acids as used in this invention can contain some trimer acids, i.e., three unit polymers, of the polyenoic monobasic acids, although the preferred commercially available dimer acids are mixtures containing about 3–25 parts of dimer acid per part of trimer acid, and for economy these readily-available mixtures are preferred. Furthermore, such dimer acids virtually always contain less than about 5 percent, and most often less than about 1 percent, of monobasic acids. Especially useful polymer acids include those formed from linoleic, linolenic, palmitolic, humoceric, and eicosinic acids, and mixtures of same.

It is to be understood that for all of the foregoing dicarboxylic polymer acids, such acids can be furnished in the coating composition in the form of their anhydride precursors where such exist. Moreover, the ammonium salts of such acids may also be employed in like manner where such exist. Thus, as used herein, the term "dicarboxylic polymer acid" is meant to include the respective anhydride and/or ammonium salt of such acid.

The balance of the organic component, that is, about 10–40 weight percent of the organic component is supplied by compounds which include amino acids free from sulphur, hydroxyl, or halogen substituents. By the use of the term "amino acids" herein is meant an organic carboxylic acid in which a portion of the non-acid hydrogen has been replaced by one or more amino nitrogens, i.e., has been replaced by at least one nitrogen having two hydrogen substituents, as for example in the amino acid alanine, or by at least one nitrogen having only one hydrogen substituent, for example, the ring nitrogen in the amino acid proline. It is not contemplated to use amino acids containing sulfur such as the amino acid methionine, or to use such acids containing hydroxyl groups as in serine, or such compounds having halogen substituents, e.g., the iodine-containing amino acid thyroxine. Coating compositions containing such acids can be deleteriously oxidized by chromic acid and may offer retarded corrosion resistance for substrate surfaces.

The suitable amino acids for the practice of this invention are chiefly the alpha-amino acids and these acids include monoamino-monocarboxylic acids such as valine, monoamino-dicarboxylic acids, as for example aspartic acid, diamino-monocarboxylic acids, e.g., lysine, as well as heterocyclic amino acids such as histidine. Also, the amino acids can be beta-amino acids, for example beta-alanine, or beta-amino hydrocinnamic acid, or gamma-amino acids such as gamma-amino butyric acid, or a delta-amino acid such as delta-amino valeric acid, or mixtures of any such amino acids. Suitable amino acids which can or have been used in the coating composition in addition to those mentioned hereinabove include glutamic acid, tryptophane, phenylalanine, citrulline, N-ethyl glycine, histidine, asparagine, glycine, N-phenyl glycine, and arginine. Some or all of these compounds may be furnished by their hydrochloride salts where such exist, for example glycine hydrochloride.

The balance of the organic component, i.e., the about 10–40 weight percent of such component can also be supplied by compounds of the structure $R_1CONHR_2$ wherein $R_1$ and $R_2$ are the same or different. Either or both of $R_1$ and $R_2$ can be a radical which, for convenience, is represented by $R'$ wherein $R'$ represents a group selected from the group consisting of alkyl, alkenyl, cycloalkyl, alkaryl, aryl, or aralkyl. The alkyl and alkenyl, are typically lower alkyl and lower alkeny, i.e., are radicals of usually six carbon atoms or less. Also, $R_2$ can be hydrogen and $R_1$ can be carbamyl, or carbamyl substituted $R'$ or carboxyl substituted $R'$. Preferably, for economy, $R_1$ is alkyl, aryl, carbamyl, or carbamyl substituted or carboxyl substituted alkyl, and $R_2$ is hydrogen, alkyl, or aryl. Useful compounds represented by this structure thus include amides and diamides, and specific useful compounds include methacrylamide, acrylamide, propionamide, N-phenylpropionamide, N-methylacetamide, succinamide, oxamide, hexaneamide, succinamic acid, N-methylhexaneamide, benzamide, N-ethylbenzamide, N-phenylbenzamide, and their mixtures.

Additionally, the balance of the organic component can be made up from heterocyclic ring compounds having at least one of the ring atoms being nitrogen and one being carbon and the remaining ring atoms being carbon and/or nitrogen. Moreover, each ring carbon atom can bear an alkoxy, oxo $R_2$ group defined hereinabove, or amino radical, or an aromatic ring, wherein two adjacent aromatic ring carbon atoms form a portion of the heterocyclic ring as in the compounds carbostyril and phthalimide. Each substituted heterocyclic ring nitrogen atom, i.e., the nitrogen atoms may be unsubstituted, can have a radical as represented by $R_2$ as defined hereinabove.

Typically such heterocyclic ring compounds have five to seven atoms in the heterocyclic ring. Representative such compounds include lactams and imides, which imides are derived from acid anhydrides, as well as compounds which, for convenience are referred to herein as "dilactams," e.g., 2,5-piperazinedione. In addition to the heterocyclic ring compounds mentioned hereinabove, suitable such compounds which can or have been used in the practice of the present invention include pyrazole, 4-methoxypyridine; barbituric acid, succinimide, isatin, uramil, oxindole, uracil, 1,2,4-triazole, pyrrole, caprolactam, N-methylisatin, N-ethylpyrrole, gamma-butyrolactam, 2-pyrrolidone, p-methylisatin, delta-valerolactam, 6-methyl-2-piperidone, omegalauric lactam, and mixtures of same.

The total organic component, regardless of composition, should be present in the coating composition, in an amount between about 5 and 200 grams per liter of such composition. The presence of less than about 5 grams per liter of such component in the chromic acid composition is uneconomical since it requires the evaporation of large amounts of solvent. Using more than about 200 grams of organic component per liter of coating composition may cause undesirable solubility problems when water alone is the volatile liquid and additionally can lead to some sacrifice in the adhesion of subsequently applied paints. Preferably for good paint adhesion and economy, the coating composition contains between about 20–65 grams of organic component per liter.

Additionally the molar ratio of $CrO_3$ to the total organic component should be within the range of about 9:1 to about 0.7:1. A molar ratio of chromic acid to the total organic component of greater than about 9:1 may provide unwanted chromium in the resulting residue, that is chromium present in the residue from the coating composition which can be liberated if a water wash is applied to the film. A mole ratio of less than about 0.7:1 for the chromic acid to the organic component can provide cured films containing insufficient chromium for enhanced corrosion resistance. Preferably for enhanced corrosion resistance without the substantial formation of unwanted chromium in the cured film, the composition contains a molar proportion of $CrO_3$ to the organic component within the range of about 5:1 to 1.5:1.

In addition to the substituents discussed hereinabove, the chromic acid composition may contain a non-ionic wetting agent such as alkyphenoxypolyoxyethelene ethanol, e.g., commercial nonylphenoxypolyoxyethylene ethanol, in concentrations typically up to about 3 grams per liter of the composition.

Before applying the coating composition to the substrate, it is desirable that the substrate be thoroughly cleaned. The use of a commercial alkaline cleaning composition which combines washing and mild abrasive treatments can be employed for this purpose, e.g., an aqueous trisodium phosphate-sodium hydroxide cleaning solution. In addition to cleaning, the substrate can undergo cleaning plus etching, e.g., with hydrofluoric acid etching agent. To accomplish the substrate etching and instead of applying only the chromic acid solution, a mixture can be applied which incorporates an etching agent in with the chromic acid composition. In lieu of a clean metal surface, an additional suitable surface for applying the coating composition is one wherein the metal substrate has been treated to exhibit a loose, powdery residue which is retained on the substrate for subsequent application of the coating composition. Such residues can promote adhesion for later applied paints.

Whether applied alone or in mixture with an etching agent, the coating composition may be applied to the substrate by any of the various methods for applying paint to a metallic substrate, for example, dip coating, roller coating or reverse roller coating, curtain coating, airless spray, rotary brush coating, pressure spray, or combinations of such methods such as spray and brush techniques. The chromic acid composition can be suitably applied as a "mill finish," i.e., factory applied. For economy, these compositions are applied in an amount yielding, after curing, below about 600 milligrams of coating residue per square foot of substrate metal and, advantageously, for enhanced adhesion of subsequently applied and cured top coatings, are applied in an amount to yield at least about 5 milligrams per square foot of such residue. Preferably, for best economy with excellent adhesion, the coating composition is applied in an amount between about 30–100 milligrams per square foot.

After application of the chromic acid composition, the substrate is heated, such as by infrared baking, at a substrate temperature, and for a period of time, sufficient to vaporize volatile solvent in the composition and deposit on the surface a composition residue which is most often at least substantially water insoluble, as well as adhering, i.e., "bonded," to the surface. After heating, the substrate surface is ostensibly dry to the touch, and the residue sufficiently bonded to the surface to withstand, typically after top coating with, for example, an alkyd enamel, at least about two inch-pounds of impact without removal of coating to bare metal on the convex (reverse) surface. For such impact testing a metal ram of specified weight, in pounds, with a hemispherical contact surface is allowed to drop on the coated panel from a predetermined height, in inches.

Heating may be initiated essentially as soon as the composition is applied, for example, baking at a substrate temperature of 400° F. or greater within 10 seconds or less of application. Generally, however, especially for factory applied compositions, air drying, e.g., within the temperature range from about 65° to about 200° F. and for a time of a few minutes or less, will precede heating. The resulting material, after such air drying, is then usually baked, especially for the water based coating compositions, by raising the substrate to a temperature advantageously within the range from about 240° to about 550° F. Temperatures below about 240° F. can often provide for prolonged, inefficient curing while temperatures above about 550° can result in some final film degradation. The substrate is heated within the above temperature range for at least about 5 seconds, but, for economy, the heating is not continued for substantially more than about 10 minutes. Curing for less than about 5 seconds can be insufficient to prepare a tough, adherent undercoating.

The preferred baking temperature varies somewhat according to the particular coating composition used. For efficiency, infrared or radiant heat is preferred. In the circumstances in which tertiary butyl alcohol is used as a coating composition medium, a substrate baking temperature of about 210°–340° F. is sufficient. When water alone is used, a higher temperature of preferably about 350°–400° F. can be employed. Water and tertiary butyl alcohol can be used together as a mixed composition medium, in which case the baking temperature is preferably within the range of about 350°–400° F.

After the coating composition is cured and the substrate cooled a weldable primer may be applied where a top coating is desired but weldability is to be retained. Additional top coatings include any suitable paint, i.e., a paint, other primer, enamel, varnish, or lacquer. Such paints can contain pigment in a binder or can be unpigmented, e.g., generally cellulose lacquers, rosin varnishes, and oleoresinous varnishes, as for example tung oil varnish. The paints may be solvent reduced or they can be water reduced, e.g., latex or water-soluble resins, including modified or soluble alkyds, or the paints may have reactive solvents such as in the polyesters or polyurethanes. Additional suitable paints which can be used include oil paints, including phenolic resin paints, solvent-reduced alkyds, epoxys, acrylics, vinyl, including polyvinyl butyral and oil-wax-type coatings such as linseed oil-paraffin wax paints.

The following example shows a way in which the invention has been practiced but should not be construed as limiting the invention. In the example steel test panels have been used which are 4″ x 12″ cold rolled, low carbon steel panels and they are prepared for coating application by typically immersing in water which has incorporated therein 4 ounces of cleaning solution per gallon of water. The cleaning solution is 25 percent by weight of tetrasodium pyrophosphate, 25 percent by weight of disodium phosphate, and the balance sodium hydroxide. This cleaning bath is maintained at a temperature of 160°–180° F. After dipping, the panels are rinsed with warm water and may be dip-coated, while still wet, in an aqueous $CrO_3$-containing coating composition. For this example the panels are permitted to air dry after rinsing and then are dipped in the nonaqueous $CrO_3$-containing coating composition described hereinbelow.

EXAMPLE

Four hexavalent-chromium-containing coating compositions for the test panels are prepared and each coating composition contains 0.5 gram per liter (g./l.) of polyoxyethylated nonylphenol. Additionally, all coating compositions contain 7.5 g./l. of succinimide and are prepared as solutions in tertiary butyl alcohol. In addition to these above named ingredients, each composition contains chromic acid and the same dimer acid in the amounts shown for each composition in the table below. The dimer acid used has an acid value of 188–196, a color on the Gardner scale of 8, contains one percent maximum of monobasic acids, and has a specific gravity at 25°/20° C. of 0.941.

Test panels are coated by dipping into the coating composition, removing and draining excess composition from the panel, air drying at room temperature until the coating is dry to the touch, and baking under infrared lamps at a substrate temperature of up to 450° F. for a time up to 1 minute. Coated panels are then tested for corrosion resistance by subjecting the panels to a condensing humidity test.

In this test water is heated in the bottom of a cabinet to produce a condition of 100 percent humidity in the cabinet and a temperature for the ambient steam within the cabinet of 120° F. Panels are placed in the cabinet at about a 15° angle to the water surface; the bottom edge of the panel is about 8 inches above the water surface, and the top edge about 10 inches above the water surface. To terminate the test, panels are either removed from the cabinet when incipient, ostensible coating failure is detected, or are removed for inspection at the times shown in the table below. Upon removal, panels are air dried and visually inspected for blisters and pinhole rust spots on the face of the panel, that is, not around the panel edges. Results are reported as time to incipient coating failure or as that portion of the total panel face, in percent, which exhibits red rust and blister coating failure.

In the table below, results are also reported for a comparative panel coating with a chromic acid-adipic acid-succinimide composition, as well as a comparative panel coated with a chromic acid-succinic acid-aspartic acid composition which panels are included in the test as a basis of comparison with compositions of the present invention. These comparative panels are coated, and the coatings cured, in the manner described hereinabove. The results of the condensing humidity test for all panels are as follows:

TABLE

| Ingredients | Concentration, grams/liter | Salt spray |
|---|---|---|
| $CrO_3$ | 40 | |
| Adipic acid | 20 | 3 hours, initial, trace failure. |
| Succinimide | 10 | |
| $CrO_3$ | 40 | |
| Succinic acid | 15 | 24 hours, 3% rust; |
| Aspartic acid | 10.1 | 48 hours, 10% rust. |
| $CrO_3$ | 40 | |
| Dimer acid | 73.8 | 115 hours, 1% rust. |
| Succinimide | 7.5 | |
| $CrO_3$ | 80 | |
| Dimer acid | 73.8 | 115 hours, 3% rust. |
| Succinimide | 7.5 | |
| $CrO_3$ | 80 | |
| Dimer acid | 36.5 | 75 hours, 2% rust. |
| Succinimide | 7.5 | |
| $CrO_3$ | 40 | |
| Dimer acid | 36.5 | 75 hours, rust free. |
| Succinimide | 7.5 | |

The above results clearly show the superior corrosion resistance obtainable by the compositions of the present invention, particularly when compared with the chromic acid/succinic acid/succinimide composition and the chromic acid/succinic acid/aspartic acid composition which, themselves, afford desirable corrosion protection.

It is understood that, although the invention has been described with specific reference to particular embodiments thereof, it is not to be so limited, since changes and alterations therein may be made which are within the full intended scope of this invention as defined by the appended claims.

What is claimed is:

1. A corrosion-inhibiting, hexavalent-chromium-containing coating composition for metal surfaces which comprises a volatile liquid having dispersed therein:
   (A) chromic acid in a concentration of between about 1 and 400 grams per liter; and,
   (B) an organic component:
      with the total weight of compounds from said (B) component being from about 5 to 200 grams per liter of the coating composition, and with the mole ratio of $CrO_3$ to the total of said (B) component compounds being within the range of about 9:1 to about 0.7:1;
wherein said (B) component is composed of:
   (1) between about 60–90 weight percent of dicarboxylic polymer acid having ethylenic unsaturation and being formed from polyenoic monobasic acids having from about 12 to about 44 carbon atoms; and,
   (2) between about 10–40 weight percent of at least one compound selected from the group consisting of:
      (a) amino acids free from substituents selected from the group consisting of sulphur, hydroxyl, and halogen;
      (b) compounds of the structure: $R_1$—$CONHR_2$ wherein $R_1$ and $R_2$ are the same or different and $R_1$ is selected from the group consisting of R', carbamyl, carbamyl substituted R', and carboxyl substituted R', and $R_2$ is selected from the group consisting of hydrogen, and R'; and
      (c) compounds having a heterocyclic ring containing at least one nitrogen atom and at least one carbon atom, with the remaining ring atoms being selected from the group consisting of carbon and nitrogen, and (i) with each substituted ring nitrogen atom bearing a member represented by said $R_2$, and (ii) wherein heterocyclic ring carbon atoms bear members selected from the group consisting of alkoxy, oxo, amino, $R_2$, and an aromatic ring, wherein two adjacent aromatic ring carbon atoms form a portion of the heterocyclic ring;
wherein said R' represents a member selected from the group consisting of alkyl, cycloalkyl, alkenyl, aryl, aralkyl, and alkaryl.

2. The coating composition of claim 1 wherein said amino acids are selected from the group consisting of alpha-amino acids, beta-amino acids, gamma-amino acids, delta-amino acids and their mixtures, and said alpha-amino acids are selected from the group consisting of monoamino-monocarboxylic acids, monoaminodicarboxylic acids, diamino-monocarboxylic acids, heterocyclic amino acids, and their mixtures.

3. The coating composition of claim 1 wherein said (B) component compounds of the group (b) are selected from the group consisting of amides, diamides, compounds containing both a carbamyl group and a carboxyl group, and mixtures thereof, and the (B) component compounds of the group (c) are selected from the group consisting of lactams, dilactams, imides, and pyrazole.

4. The coating composition of claim 1 wherein said $R_1$ is selected from the group consisting of alkyl, aryl, carbamyl, carbamyl substituted alkyl, and carboxyl substituted alkyl, $R_2$ represents a member selected from the group consisting of hydrogen, alkyl, and aryl, and in the group (c) compounds each substituted heterocyclic ring nitrogen atom bears a member selected from the group consisting of hydrogen and alkyl, and said heterocyclic carbon atoms bear members selected from the group consisting of hydrogen, alkoxy, oxo, amino, alkyl and said aromatic ring.

5. The method of protecting a metal substrate surface with an adherent, corrosion-resistant, hexavalent-chromium-containing coating composition residue, wherein the protected surface exhibits enhanced corrosion resistance, which method comprises:

applying to said surface a hexavalent-chromium-containing coating composition supplying an amount, after vaporization of volatile substituents from the applied composition, not substantially in excess of about 600 milligrams of composition residue per square foot of surface; and, heating said substrate at a temperature, and for a period of time sufficient to vaporize volatile substituents from the applied composition and deposit on the surface a residue at least substantially bonded to said surface;

wherein said coating composition comprises volatile liquid having dispersed therein:
(A) chromic acid in a concentration of between about 1 and 400 grams per liter; and,
(B) an organic component:
with the total weight of compounds from said (B) component being from about 5 to 200 grams per liter of the coating composition, and with the mole ratio of $CrO_3$ to the total of said (B) component compounds being within the range of about 9:1 to about 0.7:1;

wherein said (B) component is composed of:
(1) between about 60–90 weight percent of dicarboxylic polymer acid having ethylenic unsaturation and being formed from polyenoic monobasic acids having from about 12 to about 44 carbon atoms; and,
(2) between about 10–40 weight percent of at least one compound selected from the group consisting of:
(a) amino acids free from substituents selected from the group consisting of sulphur, hydroxyl, and halogen;
(b) compounds of the structure: $R_1$—$CONHR_2$ wherein $R_1$ and $R_2$ are the same or different and $R_1$ is selected from the group consisting of R', carbamyl, carbamyl substituted R', and carboxyl substituted R', and $R_2$ is selected from the group consisting of hydrogen, and R'; and
(c) compounds having a heterocyclic ring containing at least one nitrogen atom and at least one carbon atom, with the remaining ring atoms being selected from the group consisting of carbon and nitrogen, and (i) with each substituted ring nitrogen atom bearing a member represented by said $R_2$, and (ii) wherein heterocyclic ring carbon atoms bear members selected from the group consisting of alkoxy, oxo, amino, $R_2$, and an aromatic ring, wherein two adjacent aromatic ring carbon atoms form a portion of the heterocyclic ring;

wherein said R' represents a member selected from the group consisting of alkyl, cycloalkyl, alkenyl, aryl, aralkyl, and alkaryl.

6. The method of claim 5 wherein said substrate is heated at a temperature maintained within the range from about 210° F. to about 550° F. and for a time of at least about 5 seconds.

7. The method of claim 6 wherein volatile components of said coating composition are at least in part evaporated from the applied composition prior to said heating and said residue is present on said surface after heating in an amount of at least about 5 milligrams per square foot.

8. A coated metal substrate comprising a coating on the surface of said substrate of between about 5–600 milligrams per square foot of the residue obtained upon heating an applied corrosion-resistant, hexavalent-chromium-containing coating composition at a temperature, and for a period of time, sufficient to vaporize volatile substituents from said composition and deposit said residue at least substantially bonded to said surface, wherein said coating composition comprises a volatile liquid having dispersed therein:
(A) chromic acid in a concentration of between about 1 and 400 grams per liter; and,
(B) an organic component:
with the total weight of compounds from said (B) component being from about 5 to 200 grams per liter of the coating composition, and with the mole ratio of $CrO_3$ to the total of said (B) component compounds being within the range of about 9:1 to about 0.7:1;

wherein said (B) component is composed of:
(1) between about 60–90 weight percent of dicarboxylic polymer acid having ethylenic unsaturation and being formed from polyenoic monobasic acids having from about 12 to about 44 carbon atoms; and,
(2) between about 10–40 weight percent of at least one compound selected from the group consisting of:
(a) amino acids free from substituents selected from the group consisting of sulphur, hydroxyl, and halogen;
(b) compounds of the structure: $R_1$—$CONHR_2$ wherein $R_1$ and $R_2$ are the same or different and $R_1$ is selected from the group consisting of R', carbamyl, carbamyl substituted R', and carboxyl substituted R', and $R_2$ is selected from the group consisting of hydrogen, and R'; and
(c) compounds having a heterocyclic ring containing at least one nitrogen atom and at least one carbon atom, with the remaining ring atoms being selected from the group consisting of carbon and nitrogen, and (i) with each substituted ring nitrogen atom bearing a member represented by said $R_2$, and (ii) wherein heterocyclic ring carbon atoms bear members selected from the group consisting of alkoxy, oxo, amino, $R_2$, and an aromatic ring, wherein two adjacent aromatic ring carbon atoms form a portion of the heterocyclic ring;

wherein said R' represents a member selected from the group consisting of alkyl, cycloalkyl, alkenyl, aryl, aralkyl, and alkaryl.

References Cited

UNITED STATES PATENTS

| | | | |
|---|---|---|---|
| 2,393,663 | 1/1946 | Thomas et al. | 148—6.2 |
| 2,480,448 | 8/1949 | Coates | 148—6.21 |
| 2,559,812 | 7/1951 | Watson | 148—6.2 |
| 2,793,932 | 5/1957 | Kahler et al. | 106—14 X |
| 2,887,418 | 5/1959 | Whitly | 148—6.2 |
| 2,927,046 | 3/1960 | Andrade | 106—14 X |
| 3,382,081 | 5/1968 | Cutter et al. | 148—6.2 X |

RALPH S. KENDALL, Primary Examiner

U.S. Cl. X.R.

106—14